(12) United States Patent
Bastawala et al.

(10) Patent No.: US 11,138,215 B2
(45) Date of Patent: Oct. 5, 2021

(54) METHOD AND SYSTEM FOR IMPLEMENTING PARALLEL DATABASE QUERIES

(71) Applicant: Oracle international corporation, Redwood Shores, CA (US)

(72) Inventors: Mehul D. Bastawala, Sunnyvale, CA (US); Jonathan Giloni, San Mateo, CA (US)

(73) Assignee: Oracle International Corporation, Redwood Shores (CA)

( * ) Notice: Subject to any disclaimer, the term of this patent is extended or adjusted under 35 U.S.C. 154(b) by 331 days.

(21) Appl. No.: 16/024,540

(22) Filed: Jun. 29, 2018

(65) Prior Publication Data
US 2020/0004861 A1 Jan. 2, 2020

(51) Int. Cl.
*G06F 16/2458* (2019.01)
*H04L 29/08* (2006.01)
*G06F 12/02* (2006.01)
*G06F 9/50* (2006.01)
*G06N 20/00* (2019.01)

(52) U.S. Cl.
CPC ........ *G06F 16/2471* (2019.01); *G06F 9/5027* (2013.01); *G06F 12/0253* (2013.01); *G06N 20/00* (2019.01); *H04L 67/141* (2013.01); *H04L 67/146* (2013.01)

(58) Field of Classification Search
CPC .......... G06F 16/2453; G06F 16/24532; G06F 16/2455; G06F 16/24542; G06F 16/2471; G06F 16/1858
USPC ............................... 707/764, 718, 719, 770
See application file for complete search history.

(56) References Cited

U.S. PATENT DOCUMENTS

| | | | | |
|---|---|---|---|---|
| 9,805,092 | B1 * | 10/2017 | Welton | G06F 16/2455 |
| 9,805,101 | B2 * | 10/2017 | Singh | G06F 16/2465 |
| 10,120,900 | B1 * | 11/2018 | Welton | G06F 16/1858 |
| 2009/0024572 | A1 * | 1/2009 | Mehta | G06F 16/24542 |
| 2010/0198855 | A1 * | 8/2010 | Ranganathan | G06F 16/24532 707/764 |
| 2014/0280324 | A1 * | 9/2014 | Teletia | G06F 16/951 707/770 |
| 2015/0149439 | A1 * | 5/2015 | Idei | G06F 16/24532 707/718 |
| 2017/0329835 | A1 * | 11/2017 | Lee | G06F 9/466 |

(Continued)

OTHER PUBLICATIONS

Dewitt, D. J. et al., "Parallel Database Systems: The Future of High Performance Database Processing", *Communications of the ACM*, (Jan. 1992), vol. 36, No. 6.

(Continued)

*Primary Examiner* — Dangelino N Gortayo
(74) *Attorney, Agent, or Firm* — Vista IP Law Group, LLP

(57) ABSTRACT

Described is an improved approach to implement parallel queries where session states are saved for parallelization resources. When work needs to be performed in the parallel query system for a given session, a search can be performed to identify a resource (from among the pool of available resources) that had previously been used by that session, and which had saved a session state object for that previous connection to the session. Instead of incurring the entirety of setup costs each time workload is assigned to a resource, the saved session state can be used to re-set the context for the resource to the configuration requirements for that session.

35 Claims, 8 Drawing Sheets

(56) References Cited

U.S. PATENT DOCUMENTS

| | | | | |
|---|---|---|---|---|
| 2017/0371924 | A1* | 12/2017 | Ding | G06F 16/2453 |
| 2018/0357291 | A1* | 12/2018 | Choi | G06F 16/2379 |
| 2019/0018851 | A1* | 1/2019 | Shimizu | G06F 16/113 |
| 2019/0361996 | A1* | 11/2019 | Pan | G06F 16/21 |

OTHER PUBLICATIONS

Rahm, E. "Parallel Query Processing in Shared Disk Database Systems", in *Proc. 5th Int. Workshop on High Performance Transaction Systems* (*HPTS-5*), Asilomar, (Sep. 1993).

Rupley, Jr., M. L., "Introduction to Query Processing and Optimization", (2008), from https://clas.iusb.edu/computer-science-informatics/research/reports/TR-20080105-1.pdf.

Dijcks. J., "Parallel Execution and Workload Management for an Operational Data Warehouse", Oracle White Paper—Parallel Execution fundamentals, (Oct. 2010).

Baer, H. et al., "Parallel Execution with Oracle Database 10g Release 2", Oracle White Paper, (Jun. 2005).

Bajda-Pawlikowski, K. et al., "Efficient Processing of Data Warehousing Queries in a Split Execution Environment", *SIGMOD '11*, (Jun. 12-16, 2011), Athens, Greece.

Sivaraman, K., "Parallel Query Processing", (2014), from https://www.sjsu.edu/people/robert.chun/courses/cs159/s3/U.pdf.

Beecher, V. et al., "Oracle Database Using Oracle Sharding, 19c" (Jul. 2020).

Ogden, P. et al., "AT-GIS: Highly Parallel Spatial Query Processing with Associative Transducers", *SIGMOD '16*, (Jun. 26-Jul. 1, 2016), San Francisco, CA, USA.

Fourkiotis, D., "Implementation of Parallel and Distributed Query Processing in the Automed Heterogeneous Data Integration Toolkit", (Sep. 2007).

Hasan, W., "Optimization of SQL Queries for Parallel Machines", The Department Of Computer Science And The Committee On Graduate Studies Of Stanford University, (Dec. 1995).

Baru, C. et al., "DB2 Parallel Edition", in *IBM Systems Journal*, (1995), vol. 34, Issue: 2.

Zhang, Y. et al., "Distributed Processing and Transaction Replication in MonetDB—Towards a Scalable Analytical Database System in the Cloud", Zenodo, (Jun. 9, 2016), from http://doi.org/10.5281/zenodo.803988.

Gançarski, S. et al., "Parallel Processing with Autonomous Databases in a Cluster System", On the Move to Meaningful Internet Systems, 2002—DOA/CoopIS/ODBASE 2002 Confederated International Conferences DOA, CoopIS and ODBASE 2002, (Oct. 30-Nov. 1, 2002), Irvine, California, USA.

* cited by examiner

METHOD AND SYSTEM FOR IMPLEMENTING PARALLEL DATABASE QUERIES

BACKGROUND

Database applications interact with a database server by submitting commands that cause the database server to perform operations on data stored in a database. For the database server to process the commands, the commands typically conform to a database language supported by the database server. An example of a commonly used database language supported by many database servers is known as the Structured Query Language (SQL).

When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command.

A common way to execute SQL queries against the database server is to implement sequential query execution that uses one processor and one storage device at a time. However, in modern database systems, the amount, type, and quantity of data maintained in the database server are increasingly becoming larger and more complex. As a result, the approach of using sequential execution with only a single processing entity may result in long execution times and perceptible delays in obtaining query results.

Parallel query execution has been proposed to address the deficiencies of the sequential query execution approach. With parallel query execution, multiple processes are used to execute, in parallel, the operations of a query. For example, virtually every query execution includes some form of manipulation or querying of rows in a relation, or table of the database management system (DBMS). Before any manipulation can be done, the rows must be read, or scanned. In a sequential scan, the table is scanned using one process. Parallel query systems provide the ability to break up the scan such that more than one process is employed in the performance of the table scan.

Various parallelization resources may be implemented in the database system to facilitate parallel query processing. For example, the parallel query system may include a pool of slave processes to perform work in parallel in the system. One of the main actions that is performed in a parallel SQL execution engine is to assign work to parallel slave processes for execution. In addition, the data itself may be divided into multiple portions so that the different data portions can be accessed in parallel and separate from each other.

The parallelization resources are normally implemented as shared resources that are used by multiple end users/clients/sessions, where the sharing of these parallelization resources provides numerous resource utilization advantages. Without this concept of sharing, if a given set of resources (such as a slave process) is limited to a single dedicated client, then during periods of inactivity by that client, the slave process is not utilized to perform useful work. This is wasteful and inefficient if there are other clients which are currently waiting for computing resources. To address this problem, resource sharing is employed to permit multiple clients to share the underlying parallelization resources so that during periods of inactivity by one client, other clients can take advantage of the resource availability to process workloads.

The problem is that each time a parallelization resource switches context from one client to another, computing costs may need to be expended to change that context to another client for the parallelization resource. For example, non-trivial amounts of processor work, memory utilization, and/or network round-trips may need to be expended to coordinate the change of the resource configuration from one client to another, e.g., to change connection information, protocol setup, user authentication, set up preferences, etc.

The amount of overhead needed for this setup activity can cause a significant amount of excess costs to be required to switch contexts for the parallelization resources. This is especially true in busy database systems where large numbers of clients and sessions are actively using and accessing slaves and backend storage resources in the system.

What is needed, therefore, is a method and/or system that overcomes the problems inherent in the prior approaches, and which more efficiently implements parallelization of database workloads in a database system.

SUMMARY

According to some embodiments, a system, method, and computer program product is provided saving session states for parallelization resources. When work needs to be performed in the parallel query system for a given session, a search can be performed to identify a resource (from among the pool of available resources) that had previously been used by that session, and which had saved a session state object for that previous connection to the session. Instead of incurring the entirety of setup costs each time workload is assigned to a resource, the saved session state can be used to re-set the context for the resource to the configuration requirements for that session.

Some embodiments performed the following steps to implement parallel queries: (a) maintain and access mapping (e.g., hash table) of unique session Ids to slave IDs; (b) maintain and access mapping (e.g., hash table) of remote connections to slave IDs; (c) identify matching slaves for session and connection when client executes Parallel SQL; and (d) if there is a need for more slaves for that parallel query request, then create a new session and/or connection on the slave.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As previously discussed, a known problem with existing database parallelization solutions is that a significant amount of computing costs need to be expended to switch a given resource from one client to another.

Embodiments of the present invention resolve these problems by saving session states for the parallelization resources. When work needs to be performed in the parallel query system for a given session, a search can be performed to identify a resource (from among the pool of available resources) that had previously been used by that session, and which had saved a session state object for that previous connection to the session. Instead of incurring the entirety of setup costs each time workload is assigned to a resource, the saved session state can be used to re-set the context for the resource to the configuration requirements for that session. The following may be performed to implement this aspect of some embodiments: (a) maintain and access mapping (e.g., hash table) of unique session Ids to slave IDs; (b) maintain and access mapping (e.g., hash table) of remote connections to slave IDs; (c) identify matching slaves for session and connection when client executes Parallel SQL; and (d) if there is a need for more slaves for that parallel query request, then create a new session and/or connection on the slave.

Figure 1A:
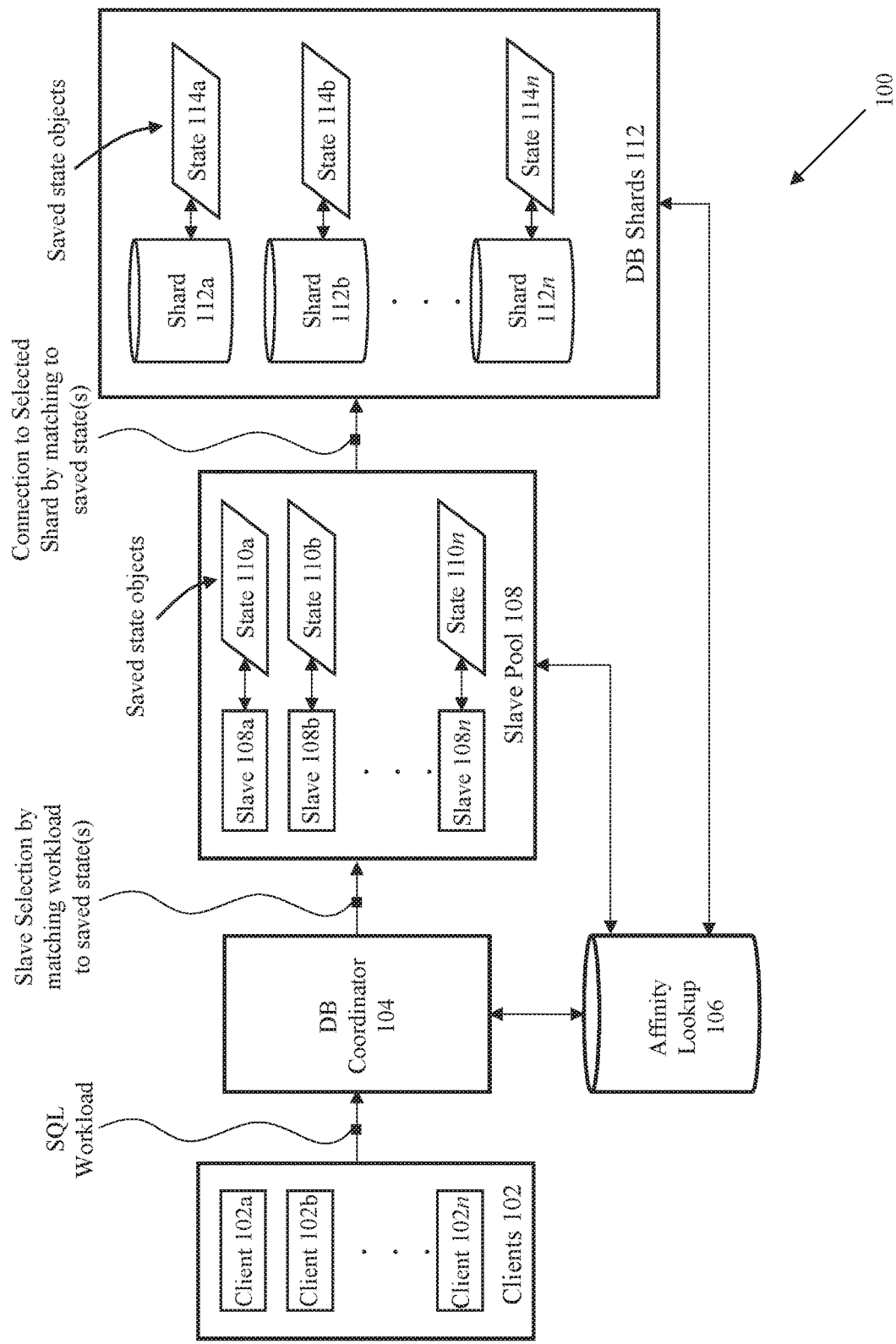
FIG. 1A illustrates a system 100 for implementing parallel query process with saved session states according to some embodiments of the invention.

FIG. 1A illustrates a system 100 for implementing parallel query processing with saved session states according to some embodiments of the invention. The system includes any number of clients 102a, 102b, . . . 102n. One or more users at the clients operate a user station to issue SQL commands to be processed by the database system. The user station comprises any type of computing station that may be used to operate or interface with the database system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

The SQL workload issued by the clients are received for processing by a database query coordinator 104. The coordinator 104 is responsible for building and coordinating execution plans to handle the SQL workload. In addition, the coordinator is responsible for selecting one or more specific parallelization resources (e.g., slaves) to handle the SQL workload.

A pool 108 of processing slaves 108a, 108b, . . . 108n are provided in the system 100 to process the SQL workload from the clients 102. Each of the slaves within the pool 108 correspond to an entity that is capable of performing work in a computing system. Examples of such processing entities include computer processes, threads, tasks, virtual machines, containers, pods, computing nodes/devices (e.g., separate/individual/distributed computing nodes/stations), and/or any other type of hardware, software, or combination thereof that is capable of processing computing work (which are hereby collectively referred to without limitation as a "slave", "process" or "slave process").

The data within the database itself may be divided into multiple database portions. As illustrated in this figure, the database may be implemented as a sharded database having any number of shards 112a, 112b, . . . 112n. "Sharding" refers to the process of breaking a large dataset into separate portions called "shards". The reason to shard a database is because as the size of data grows within a database (e.g., with tables containing hundreds of thousands or even millions of rows), it often becomes infeasible to efficiently processing work over the entirety of that data when collected into a single object. With sharding, the database server may parallelize execution of SQL command on computing devices with more than one processor to reduce execution times by having each slave 108a-n operate on a subset of the data object.

The shards may be distributed in any suitable manner on any appropriate type of computing hardware. For example, in one embodiment, the shards may be located on distributed computing devices that are physically separated from each other, e.g., on separate nodes that may be either local (on a LAN) or geographically remote from each other (on a WAN). Each shard is created as its own instance within the database system.

It is noted that the data may be sharded/divided using any suitable type of data handling techniques within the scope of various embodiments of the invention. For example, data partitioning may also be employed as an alternate approach to divide the data objects into multiple portions. As such, the invention is not to be limited only to sharded databases unless expressly claimed as such. In addition, the inventive concept may be applied even if the data is not subdivided into multiple portions. Thus, the inventive concepts disclosed herein may be applied even where sharding is not used, e.g., as discussed below to select an appropriate slave for handling work based upon the saved state(s) for that slave—without consideration of saved states for shards.

One of the main responsibilities of the coordinator 104 is to select one or more slaves to which the SQL workload tasks are distributed for parallelized processing. The coordinator will set up the session state of the mid-tier client in the slave process. Because the slaves are a shared resource, once the task being handled by the slave has completed, the session state needs to be freed on the slave to allow the slave to take on another task.

The problem addressed by the present invention is that the next client SQL that will use the slaves can be from either the same or different client session. Each time a parallel SQL operation is run, this may therefore cause the session state to be re-created on these slaves if the next work is from a different session/client. It is noted that costs may be incurred even if the same session/client is executed again since it would have been freed at the end of the last request and thus may also be re-created. The cost of re-creating session state can add up. For example, with cross shard queries that go to several shards, each slave may need to re-create the connection on remote shards. In a shard scenario, the cost could correspond to both re-creation of both/either the connection and the session.

Embodiments of the present invention solve this problem by having some or all of the slaves maintain saved state objects 110a, 110b, 110n that retain one or more previous session states. Instead of completely discarding a session state when a slave has completed a task, the session state can be retained for some period of time in the session state object. The session state objects encapsulate and represent configuration settings such as user identity and client settings such as language and timezone settings. When the task is completed the session state is kept in slave process memory. Over time, based on which client tasks are routed to which slaves, each slave will have a set of session state objects.

At a later point in time, if a SQL operation from a previous session is assigned to a slave that has a saved session state for that session, then instead of re-creating the entirety of the session state on the slave, the session state can be loaded from the session state object. For example if the session state object is stored in memory, then the configuration and parameters values can be restored with very efficient memory copy operations (rather than requiring network round-trips to the slave to send and restore those settings). In some embodiments, a pointer is used to point to a saved session state object, allowing for very little copying into a private state. Further details regarding an approach to use a pointer for the cached session state is described below relative to the description of FIGS. 2A-B.

The database may also maintain session state objects 114a, 114b, . . . 114n to retain session states for the shards 112a, 112b, . . . 112n. The session state objects for the shards will be used to retain, for example, connection-related information and settings for the slaves/sessions. This provides a way to save physical connections (e.g., sockets) to the remote shards with respect to client session authentication. When a slave needs to make a call to remote shard, it will check if it has a saved connection to that remote shard. If so, then it does not need to re-create a physical connection, nor does the slave need to perform protocol setup such as exchanging endian-ness and configure how different data types will be handled.

The status and/or metadata for the shared state objects 110a-n and 114a-n may be maintained in an affinity look up structure 106. The affinity lookup structure 106 may therefore include a first mapping structure (e.g., a first hash table) that maps unique session IDs to slave IDs, as well as a second mapping structure (e.g., a second hash table) to map the slave IDs to the remote connections to shards. As discussed in more detail below, the affinity lookup structure 106 is accessed to identify the appropriate slave and/or connection to employ for handle a given SQL workload or task.

It is noted that with regards to the shards, the remote connection and the session are not necessarily for the same entities. For example, there could be a connection to the shard that is needed, but the shard may or may not also have a matching session there.

There are different types of configurations that may need to be set up when using slaves to process work. A first example type of setup is the connection that needs to be established between a slave and a shard, e.g., the physical connection that is established between a given slave and a given shard through a socket. A second example type of set pertains the environmental configuration that is established for a specific session. These configuration may include, for example, establishing a user logon, a user role, and user privileges. These environmental configurations are set up to allow a slave/shard to execute SQL on behalf of a user with that user's access rights and permissions. A third example type of configuration pertains to the setup of a "color" for a session. Color refers to specific characteristics that needs to be implemented to execute the SQL in a given way for the session, e.g., to set up a specific language, time zone, and/or data sort order to process the SQL.

Over time, as different slaves are assigned to process work for different sessions, and where the slaves connect to different shards over time, different combinations of those configuration factors may get stored in the session state objects on the slaves and/or shards.

Figure 1B:
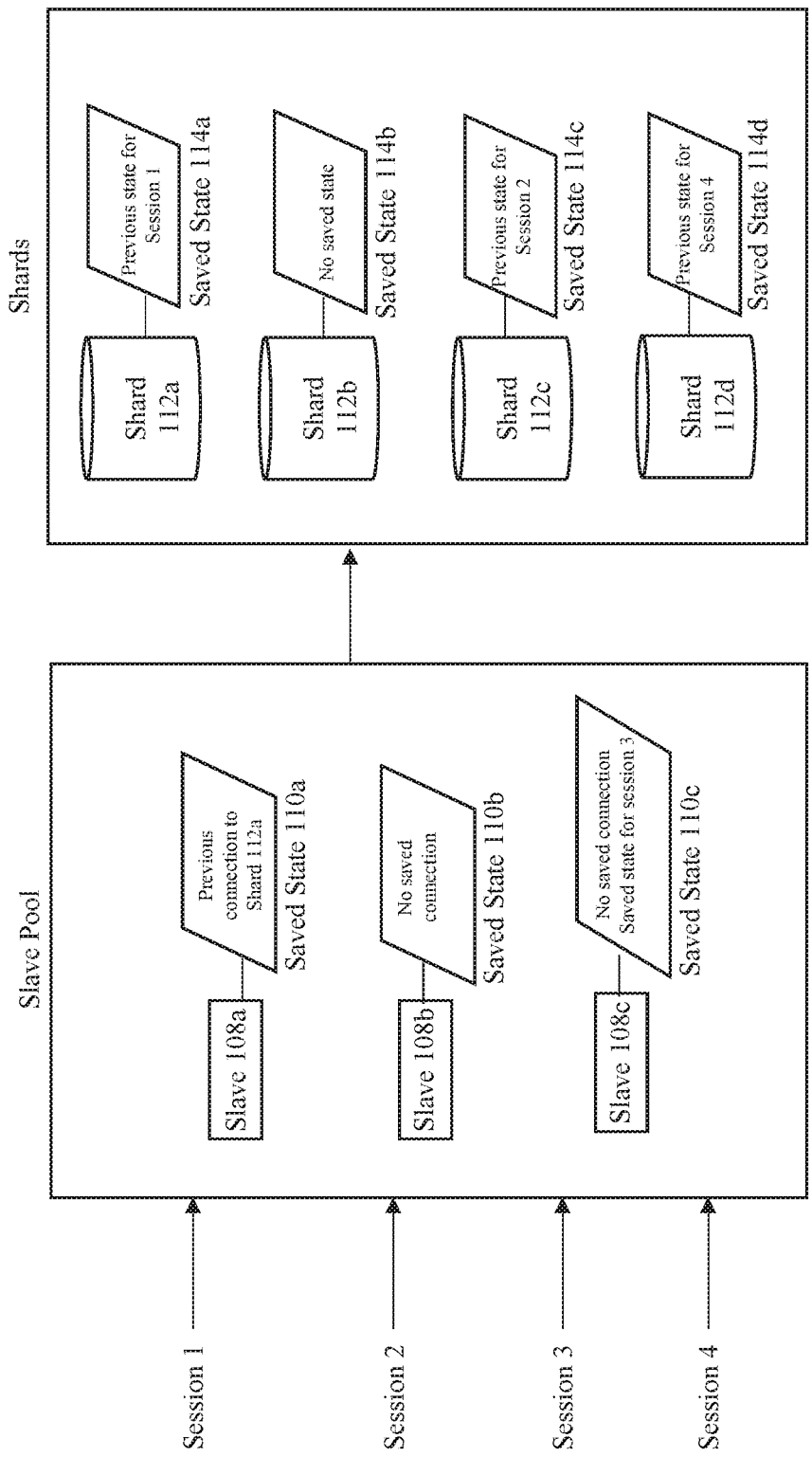
FIG. 1B illustrates an embodiment of the invention.

To explain, consider illustrative situation shown in FIG. 1B. Here, there are three slaves 108a, 108b, and 108c in the slave pool. The database object in this example is divided into four shards 112a, 112b, 112c, and 112d.

Based upon a previous operations by the slaves, it can be seen that the saved state object 110a for slave 108a indicates an affinity between slave 108a and shard 112a. This means that slave 108a has previously configured a connection to shard 112a, and that an affinity has been saved in the session state object 110a for this connection. In contrast, slave 108b does not have any saved connections to any of the shards.

Slave 108c does not have any saved connection states to a shard within its associated session state object 110c. However, slave 108c does have saved state for session 3, as indicated in session state object 110c, indicating that this slave 108c had previous performed work for session 3 and still retains that session state information available for restoration if called upon to do work again for session 3.

With regards to the shards, shard 112a has saved state for session 1, as indicated in session state object 114a. This means that shard 112a has been previously configured to execute work on behalf of session 1, and hence if called upon to process work in the future for session 1, would not need to re-create the session state from scratch for this session. Instead, that saved session state can be efficiently re-imposed upon shard 112a if there is a need again to perform work for session 1. Similarly, shard 112c has saved state for session 2 as indicated in session state object 114c, while shard 112d has saved state for session 4 as indicated in session state object 114d. It is noted that shard 112b does not have any saved session states.

In the current situation shown in FIG. 1B, assume that a new work item comes in for session 1 where the SQL needs to access data on shard 112a. In this situation, there is a clear affinity to assign slave 108a to perform this work. This is because slave 108a has saved state for a connection to shard 112a, and shard 112a has saved state already for session 1.

As such, if slave 108a is assigned for this work, then there is no need to re-create the connection between slave 108a and shard 112a (as would be required in any of the other slaves are assigned for this work). Furthermore, since shard 112a has saved state for this session, this means that there is no need to re-create the environmental setup for this session 1 on shard 112a. When this work is completed the session state for this work will be saved in the respective session state objects as needed, e.g., to add (a) saved session state for session 1 to session state object 110a and (b) the connection state between slave 108a and shard 112a to session state object 110a.

As another example, assume that a new item of work is received for session 3 that needs to access data in shard 112b. Here, none of the slaves have an existing saved state for a connection to shard 112b; therefore, the connection mapping between the slave IDs and the shards will not produce a match. However, the mappings between session IDs and slave IDs will show a match between session 3 and slave 108c, as indicated by saved state object 110c. Therefore, the new item of work for session 3 is likely to be assigned to slave 108c, since the saved state for this slave will allow the slave 108c to perform work for session 3 without having to re-create the session state from scratch. When this work is completed the session state for this work will be saved in the respective session state objects as needed, e.g., to add (a) saved session state for session 3 to session state object 114b and (b) saved connection state between slave 108c and shard 112b to session state object 110c.

Another example pertains to the situation where a new item of work is received for session 4 that needs to access data in shard 112d. Here, none of the slaves have an existing saved state for a connection to shard 112b; therefore, the connection mapping between the slave IDs and the shards will not produce a match. In addition, the mappings between session IDs and slave IDs does not show a match between session 4 and any of the slaves. Therefore, since there is no affinity for the new item of work for session 4 to any slave, and none of the slaves have an affinity to shard 112d, this means that any of the available slaves can be assigned to handle the new work. It is noted that shard 112d does have an affinity for session 4, based upon saved state object 114d. As such, while certain setup activities may be needed to set up the connections for the selected slave, cost savings would still exist due to setup costs that may be skipped at the shard 112d.

As yet another example, assume that a new item of work is received for session 2 to access shard 112b. Here there is no match between that specific session ID and any of the saved states for the slaves. In addition, there is no match between the slave IDs to that specific shard 112b. As such, there are no matches that can be found for an affinity between any of the parallelization resources and the work request. In this situation, any of the slaves can be assigned to handle the work (likely on the basis of load balancing), and the full set of setup activities would need to be performed.

Over time, as more and more work is performed on behalf of various sessions that seek to access different shards, the various slaves and shards will include more and more saved states for the different connections, sessions, and colors. For example, when client execute the same SQL statement over time, bind variable values within the SQL will likely cause additional accesses for that session to different shards, and with those shards saving session state for that session, this means that greater numbers of affinities between shards and that session will be established.

Figure 2A:
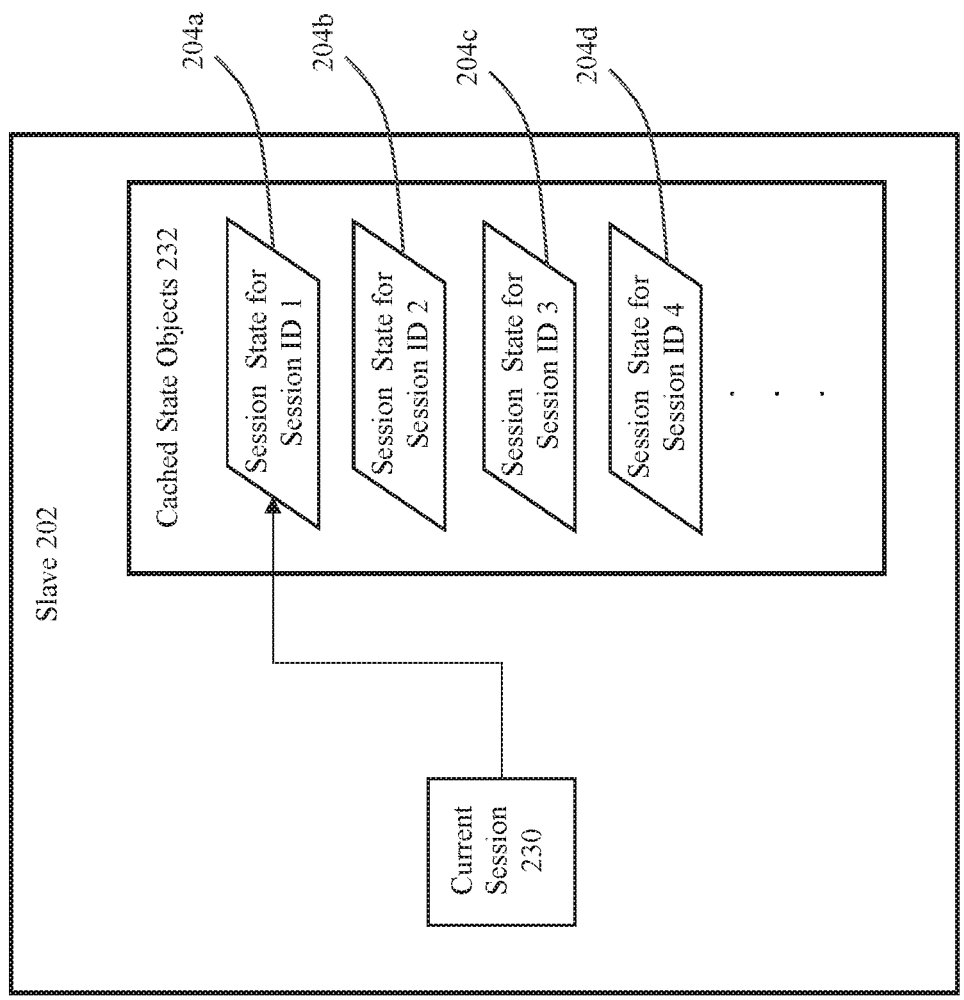
FIGS. 2A-B illustrate an embodiments of the invention for pointing to a session state object.

FIG. 2A illustrates an approach to implement some embodiments of the invention, in which an array of cached state objects 232 is employed by a slave 202. Each state object within the array 232 is differentiated by session, user, color, and/or connection. For example, in one embodiment, an array of session state objects is differentiated by user and color per connection to each shard. In the illustrative example of FIG. 2A, each of the state objects are associated with a specific session ID. In particular, state object 204a is associated with session ID 1, state object 204b is associated with session ID 2, state object 204c is associated with session ID 3, and state object 204d is associated with session ID 4.

Figure 2B:
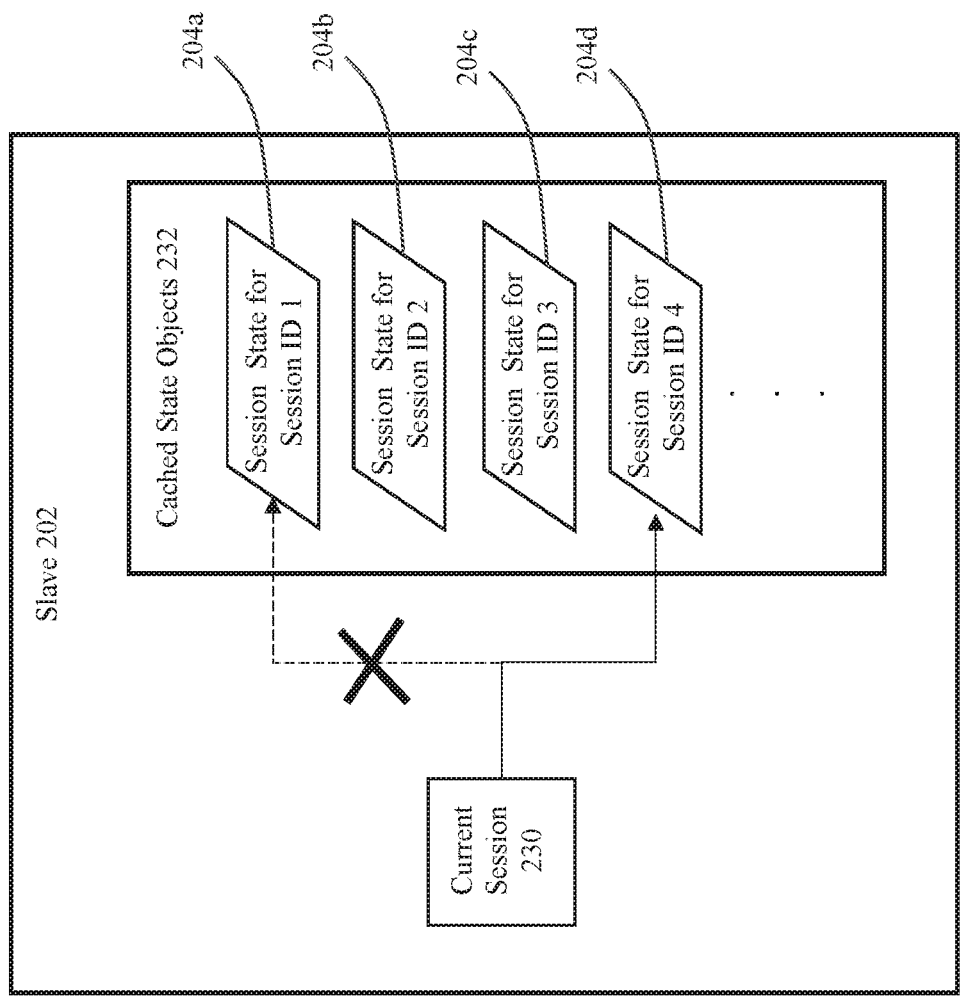

When a slave is selected on the basis of an affinity to a cached state, the slave memory will point the current session pointer 230 to the relevant session state object that most closely matches the required configuration for that client that invokes the SQL being run in parallel. In this illustrative example, the current session pointer is currently pointing to object 204a, indicating that slave 202 is currently performing processing on behalf of the session with ID 1. However, assume that at a later point in time, slave 202 is selected to perform processing on behalf of a different session having ID 4, e.g., due to slave 202 having an affinity to session ID 4 due to a state object 204d being cached by this slave. As shown in FIG. 2B, slave 202 can very quickly and efficiently perform this processing without having to re-create the state for this session, by simply re-pointing the current session 230 to state object 204d.

While not shown in the figure, the same technique is applicable to the shards as well. The shards may also maintain an array of cached state objects that tracks the affinities for the shard. When a connection is made to that shard that corresponds to a cached state, the system can simply point to the appropriate state object rather than having to re-create the required state.

It is noted that alternate approaches may be employed within various embodiments of the invention to maintain state objects at the slave. For example, a set of marshalled states can be maintained at the slaves to create and track the affinities for those slaves. When a slave is selected based upon an affinity, the appropriate state is un-marshalled and loaded by the slave, rather than re-creating that state. This marshalling and un-marshalling can similarly be performed on the shards as well.

In another embodiment, other setup items can also be configured in addition to and/or instead of the current session, such as current user, current roles, current color that can be set from the matching cached state object. The above-described approach to switch a pointer can also be used for these other setup items, where the switching algorithm uses either a pointer to whole state object or setup key session states to the matching state object. This "switch" can be relatively inexpensive compared to creating a whole new session.

In some embodiments, these cached state objects may be persisted on disk or placed in shared memory accessible by the slaves. The matching persisted session state object that most closely matches the required configuration for that client that invokes the SQL can then be materialized in-memory. For partial matches, other setups to the matching session state for session items can be configured, such as user, roles, colors. Persisting the matching state can allow a greater number of session states to be cached on the secondary storage. This is particularly advantageous, as secondary storage is typically less expensive than RAM and is available in greater supply. In addition, since secondary storage is often persistent (e.g., in a hard drive or cloud/network storage), this means that this type of storage can withstand any software failures of the parallel server.

In some embodiments, the cached state objects can be shared across slaves as well. The matching session state object that most closely matches the required configuration for that client that invokes the SQL can be used by any of the slaves that have accessed to the shared objects. For partial matches, other setup to this matching session state for session items such as user, roles, color can be implemented. In some embodiments, the shared session states can be also be persisted on secondary storage.

Figure 3:
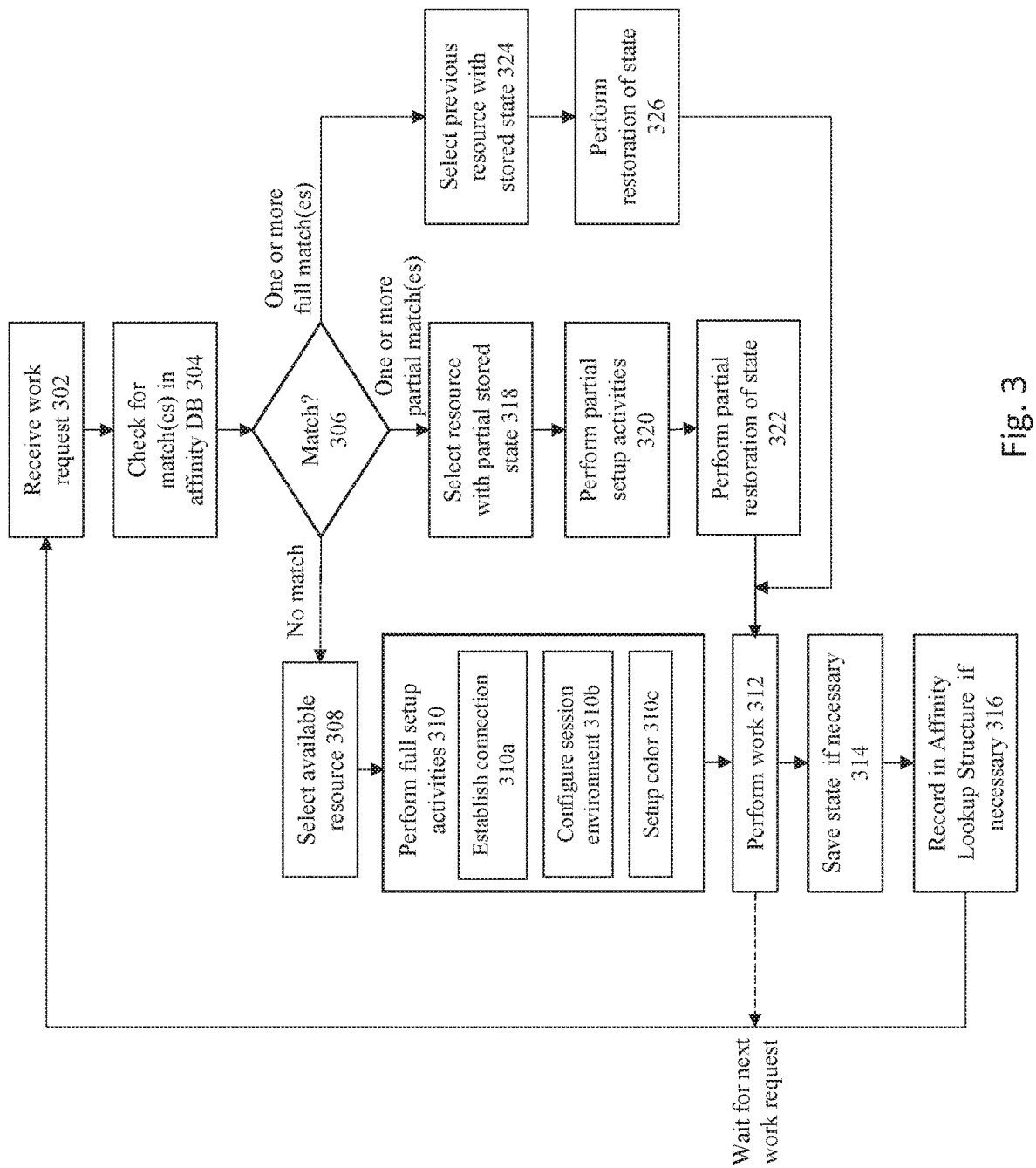
FIG. 3 shows a flowchart of an approach to implement some embodiments of the invention.

FIG. 3 shows a flowchart of an approach to implement some embodiments of the invention. At 302, a work request is received for processing. The work request is from a specific client and is associated with a unique session ID, which in a database system likely pertains to SQL command that needs to be processed.

At 304, a determination is made whether there are any matches for the session ID for the work request. An affinity lookup structure may be accessed to make this determination, where the affinity lookup structure includes a first data structure that maps the session IDs to slave IDs and a second data structure to map shards to slave IDs. The actions of 304 are to identify whether and to what extent the parameters of the work request match to the various saved states that exist within the session state objects of the system.

If the query to be processed involves fetching data or performing DML, on remote shards, a check will be made on which shards' connection are on which slaves. The most effective slave is one which has both the remote connection to shard and session ID. On the other hand, the system can still use a slave having the remote connection and establish the user session to that remote shard (which is then cached).

At 306, a determination is made whether any parallelization resources are matched to the parameters of the work request. There are three possibilities with regards to the match conditions. A first situation pertains to when there are no matches at all to saved states within the system. A second possibility is that there are one or more partial matches to the parameters of the work request. A third possibility is that there are one or more matches to all of the parameters of the work request. Each of these possibilities are addressed below.

If there are no affinity matches to the work request, then any of the available resources are selected to handle the workload. This means, for example, that any of the slaves within the slave pool can be assigned to handle the work. Therefore, at 308, an available slave from the slave pool is assigned to the work.

At 310, full setup activities will need to be performed to process the work. At 310a, the connection between the slave and the shard will need to be configured. This sets up the physical connection (e.g., socket) between the slave and the shard that is accessed to process the SQL statement. At 310b, the session state is configured for the workload. This action involves, for example, setting up the login and authentication for the user, as well as configuring roles and privileges for the user. At 310c, color configuration occurs for the workload. This setup action pertains to setting up color attributes, such as language, time zone, and data ordering attributes.

These setup activities may involve a significant level of cost. This is because the connection setup involves starting foreground processes, performing user authentication and protocol setup, for example—where these activities correlate to heavy weight system burdens and may even consume approximately 300 milliseconds per connection/session setup. One reason for the high cost of these activities is the fact that there may need to be several network round-trips for the connection setup. In addition, if the client has set properties such as language or timezone, then these properties will also need to be set.

These costs will increase even further if the slave is located in a different geographic region from the shard to which it needs to connect. For example, the round-trip overhead cost between Europe and Japan can be on the order of 250 milliseconds. The query cost could be on the order of 50 milliseconds. The connection setup time between Europe and Japan could take approximately 600 milliseconds. If cross shard SQL query takes two round-trips at a cost of 550 milliseconds (500 milliseconds for two roundtrips and 50 milliseconds for performing the query), then the total cost with setup would be 550+600=1,150 milliseconds. However, with the use of saved session state objects pursuant to embodiments of the invention, the 600 milliseconds setup costs could be saved.

From the preceding paragraphs, it should be apparent why it is so costly to perform a full configuration setup for a slave. If there are thousands of parallel queries, then without the current invention, the above session state setup costs would need to be repeated on each and every slave for each and every handling of workload that involves a change of a session. For cross shard queries, there will be repeated setup costs to connect to each shard.

Once set-up activities have been completed, then at 312, the desired work is performed by the newly configured slave and/or shard. The SQL statement is executed against the data within the selected shard of the database and query results are processed and returned back to the client.

Once the work has been completed, then at 314, the state is saved within one or more session state objects. In some embodiments, separate session state objects are maintained for each of the different types of the state to be saved, e.g., with separate objects for the connection state, session state, and color state. In an alternate embodiment, the color information is maintained as attributes within the session state. At this point, at 316, the mappings for the saved states are recorded within the affinity database. In one embodiment, the affinity map database can be in memory or can also persist to secondary storage. The process then waits for the next work request, which causes the process to loop back to 302 upon receipt of a new work request.

For the second match scenario of partial matches, if at 306 it was determined that there are one or more partial matches, then at 318, one of the partial matched slaves is selected to handle the workload. Any suitable ordering may be applied to determine, from among multiple partial matches, which of the partially matched slaves should be selected. For example, the ordering can be configured on the basis of the relative costs of the matched states versus the unmatched states for the work request. For instance, assume for the sake of explanation that in terms of configuration setup, connection setup (310a) is the most expensive, followed by session state setup (310b) being less expensive, with color setup (310c) being the least expensive. In this situation, a first slave having a saved connection state (and no saved session state or color state) would be ranked higher than a second slave having a saved color state (but no saved connection state or session state). This is because the first slave would be less expensive to set up (because it does not need to set up a new connection) compared to the second slave (which does need to set up a new connection). It is noted that this example ordering is merely illustrative, since in some circumstances the color setup may be quite expensive (e.g., where there is a large number of color attributes to set up).

At 320, partial setup activities are performed for the selected slave/shard. These setup activities are performed for the configurations for which there are no saved states. At 322, partial restoration of state is performed for the configurations for which there are saved states. Once set-up activities have been completed, then at 312, the desired work is performed by the newly configured slave and/or shard. The SQL statement is executed against the data within the selected shard of the database and query results are processed and returned back to the client.

If necessary, at 314, the state is saved within one or more session state objects. At 316, the mappings for the saved states are recorded within the affinity database if necessary. These actions are performed for any of the configuration setups that needed to be newly performed at 320.

For the third match scenario of full matches, if at 306 it was determined that there are one or more full matches, then at 324, one of the fully matched slaves is selected to handle the workload. As before, any suitable ordering may be applied to determine, from among the multiple matches, which of the matched slaves should be selected. For example, load balancing rules may be applied to select the slave with the least work to handle the new work request.

At 326, state restoration is performed for the previous saved configurations. Once state restoration activities have been completed, then at 312, the desired work is performed by the newly configured slave and/or shard. The SQL statement is executed against the data within the selected shard of the database and query results are processed and returned back to the client.

Session re-use garbage collection may be performed according to some embodiments. The general idea is that at some point in time, maintenance can be performed to remove some of the saved session states. This frees up the space occupied by less relevant session states so that there is enough room to save newer and perhaps more relevant states.

Figure 4:
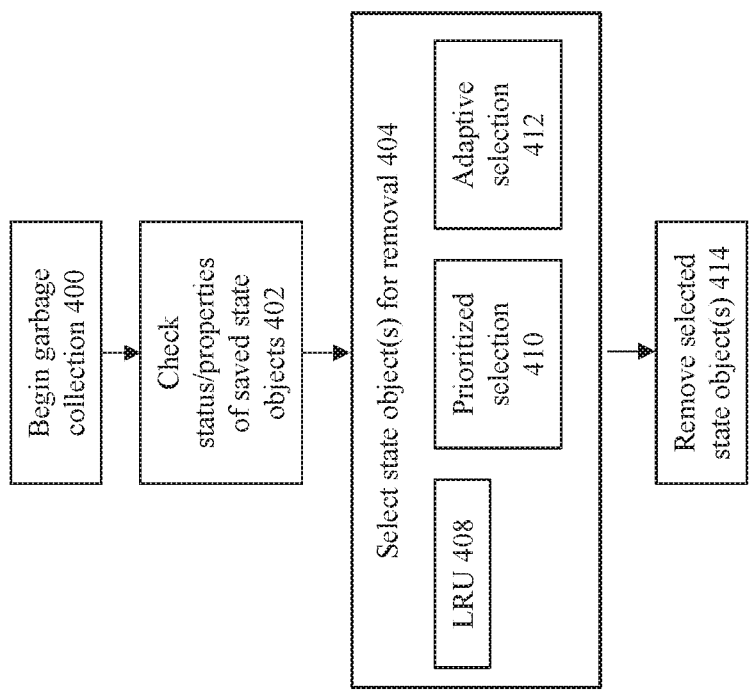
FIG. 4 shows a flowchart of an approach to implement session reuse garbage collection according to some embodiments.

FIG. 4 shows a flowchart of an approach to implement session re-use garbage collection according to some embodiments. At 400, the garbage collection process is initiated. This initiation may occur according to any suitable criteria. For example, a threshold number/size of session state objects can be established, where garbage collection occurs when the number of session state objects exceeds the threshold and/or when the space occupied by the session state objects exceeds a threshold size limit. Garbage collection can also occur on a periodic or regular basis. In addition, garbage collection can occur upon manual initiation by an administrator.

At 402, the status and/or properties of the session state objects are checked. Example properties that may be checked include, for example, time/date of last access, time/date of creation, and/or object size.

At 404, zero or more session state objects may be selected for removal. Any suitable approach can be employed to select the session state objects for removal. For example, at 408, the least recently used (LRU) session objects can be removed. The LRU scheme may be applied over designated time periods to identify objects to remove from cache. Alternatively, at 410, prioritized selection of objects can be performed, where certain objects/configurations are identified as having higher levels of priority than others. If certain objects are identified with greater and/or lesser levels of importance/priority, then this factor can be weighted in conjunction with and/or instead of the LRU factors to identify objects for removal and/or preservation. For example, the higher the user priority and privilege level within the global shard database, the more its session state objects are freed up later. As another example, the higher the latency (or distance) to the shard, then the more its connection state object may be more expensive to set up, and hence corresponds to a higher priority.

At 412, adaptive selection may also be performed to identify session state objects to remove and/or preserve. For example, machine learning may be applied to learn patterns of resource usage within the system to manage the set of session state objects to retain in the system. Machine learning pertains to systems that allow a machine to automatically "learn" about a given topic, and to improve its knowledge of that topic over time as new data is gathered about that topic. The learning process can be used to derive an operational function that is applicable to analyze the data about that system, where the operational function automatically processes data that is gathered from the activity or system being monitored. This approach is useful, for example, when a vast amount of data is collected from a monitored system such that the data volume is too high for any manual-based approach to reasonably and effectively perform data review to identify patterns within the data, and hence automated monitoring is the only feasible way that can allow for efficient review of that collected data. For instance, "supervised learning" may be employed where a set of training data is collected for usage patterns of the specific sessions, SQL, slaves, and/or shards that are accessed over certain time periods, and where these patterns are used as representative data for the system being monitored. A learning algorithm then takes that training data, and implements a training method to obtain a model for the system, where the model usually corresponds to a predictive model that can predict future outcomes based upon the past behavior and observed datapoints. The models are then used to predictively and adaptively determine which session state objects should be created, retained, and/or discarded. In one embodiment, a system that calculates the probability of misses can be used. In this system, every time there is no match to a connection or session state objects, then the properties of this missed object that needs to be recreated are stored along with the time of miss. If the system frees up the connection or session state objects such that the next SQL from a client need them, then this indicates that garbage collection is to be improved. For example, if the system is heavily using shard 112b, it will be in a miss table if the slaves free the connection object to shard 112b. The past miss data will be used to place a higher priority for these connection objects in the next garbage collection cycle. The miss data can be purged periodically.

Thereafter, at 414, the selected state objects are removed from the system. The space occupied by these removed objects is freed up to store additional session state objects.

It is noted that two client sessions that have same user identity can reuse the session state object after removing any client properties set from previous session and setting the new properties. This situation occurs where there is the same database user but a different client user, e.g., where multiple clients access a common middleware with different client IDs, but are accessing a database with a common database ID (e.g., where all users in an organization's department access a database using a common departmental ID, but are connecting from different clients and hence have different client IDs). Property sets are tracked so they can be reversed to default (language, timezone, SQL edition) setting. When the properties are set, they are tracked so that the default settings can be changed. For example consider if settings were changed to modify the timezone from default EST to PDT and language from USASCII to UTF8. Now, if the closest matching session state object has the same user connected but does not correspond to the requested color of timezone MST and default language setting, then the system can reset the timezone from EST to MST and the language from UTF8 to USASCII of the matched session state object. This alteration is typically not expensive compared to the cost of re-creating a new connection and/or session.

When there is a choice of two or more session states where the respective property sets do not match fully, one of the partially-matching states can be selected. In one embodiment, one can choose session state with highest number of properties that match. The matching score can then be the number of properties that match. As an illustrative example, in another embodiment one can put weights on properties, and the partially-matching session state that is selected is one with the highest score when considering the number of matching color properties minus the number of set properties that needs to be reversed. For example, consider if session state1 matches language and SQL edition, and has a default timezone (such as EST), while session state 2 matches language and has a different timezone (e.g., MST). In this example situation, session state1 is preferred as there are two properties matched with no properties to reverse giving it a matching score of 2*1−0*1=2 (number of matching properties (2) multiplied by base matching score (1) minus number of properties to re-set to default (0) multiplied by score for property reverse). Session state2 is less preferred as there is one property matched with one property to reverse giving it a matching score of 1*1−1*1=0 (number of matching properties (1) multiplied by base matching score (1) minus number of properties to re-set to default (1) multiplied by score (1) for property reverse). One can also give weights to certain properties, such as user identity and roles, as matches for these properties implies greater more cost effectiveness for corresponding states having these matching properties since these properties do not need to be reversed. This is because cleaning up states related to a first identity and setting a clean session state to second identity can require the system to incur greater computational expenses and costs. In the above example, assume that session state1 had a different identity of user 2, where the weight applied for a user change is 3. In this situation, a revised scores for state1 would be 2*1−3*1=−1 (number of matching properties (2) multiplied by base matching score (1) minus weight (3) of user identity property to re-set multiplied by score (1) for property change). In contrast, the score for state2 would be 1*1+3*1−1*1=0 (number of matching properties (1) multiplied by base matching score (1) plus weight (3) of common user identity property multiplied by score (1) for user property minus number of properties to re-set to default (1) multiplied by score (1) for property reverse). In this situation, even though both session 1 and session 2 have a single property to change, the weight applied for the user identity property change for state1 compared with the less-weighted property change for state2 gives session state2 as the preferred state. This example assumes the weight of color properties for language, timezone, SQL edition is 1.

For parallel tasks, there can be dependency of session IDs amongst slaves. For these dependent situations, removal of session state from a first slave means that the session state can be designated for removal from a second slave that has a dependency relationship. The dependency can also put a constraint on removal if one of the dependencies are in use at another slave.

Each slave can accumulate connections to multiple shards over time. A limit can be imposed upon such connections as well. For example, the above garbage collection approach can be taken to clean up connections for slaves. In the alternative, a designated maximum limit can be designated on the number of outgoing connections or a limit per connection for the slaves.

The session state can also be compressed into a signed key value pair that represents user identity and any properties set. When the session is selected to be the active session, one can uncompress the session state so the SQL executes in same environment on the remote shard as it would have been executed on a local RDBMS instance (if it was not run in parallel). With compressed state, more session states can be cached on slaves and on the remote.

Sessions in some embodiments can be cached separately from the slaves such that any slave can attach one from the cache. In this situation, the coordinator can just look for a slave with a connection to the appropriate shard and then that slave can pull a matching session from the cache or create one if none exists. The advantage is that the system does not encounter scenarios where there is a slave with the session but that slave is in use currently by another client.

Therefore, what has been described is an improved approach to implement parallel query implementations, where session states are saved for the parallelization resources. When work needs to be performed in the parallel query system for a given session, a search can be performed to identify a resource (from among the pool of available resources) that had previously been used by that session, and which had saved a session state object for that previous connection to the session. Instead of incurring the entirety of setup costs each time workload is assigned to a resource, the saved session state can be used to re-set the context for the resource to the configuration requirements for that session.

This approach solves the technological problem of excessive resource consumption in a computing system by having to re-create session states and connections each time a slave performs work for another client/session.

By using the inventive approach, less computing resources are consumed when parallelizing query execution. This improves the function of the computer itself by reducing the consumption of computing resources (e.g., reducing network traffic/roundtrips and processor load by minimizing the actions needed to perform set up), and increases the speed of query processing by reducing delays and latency associated with connection and session state setup. The inventive approach also improves other technological areas pertaining of database management and processing, as well as computer parallel processing.

System Architecture Overview

Figure 5:
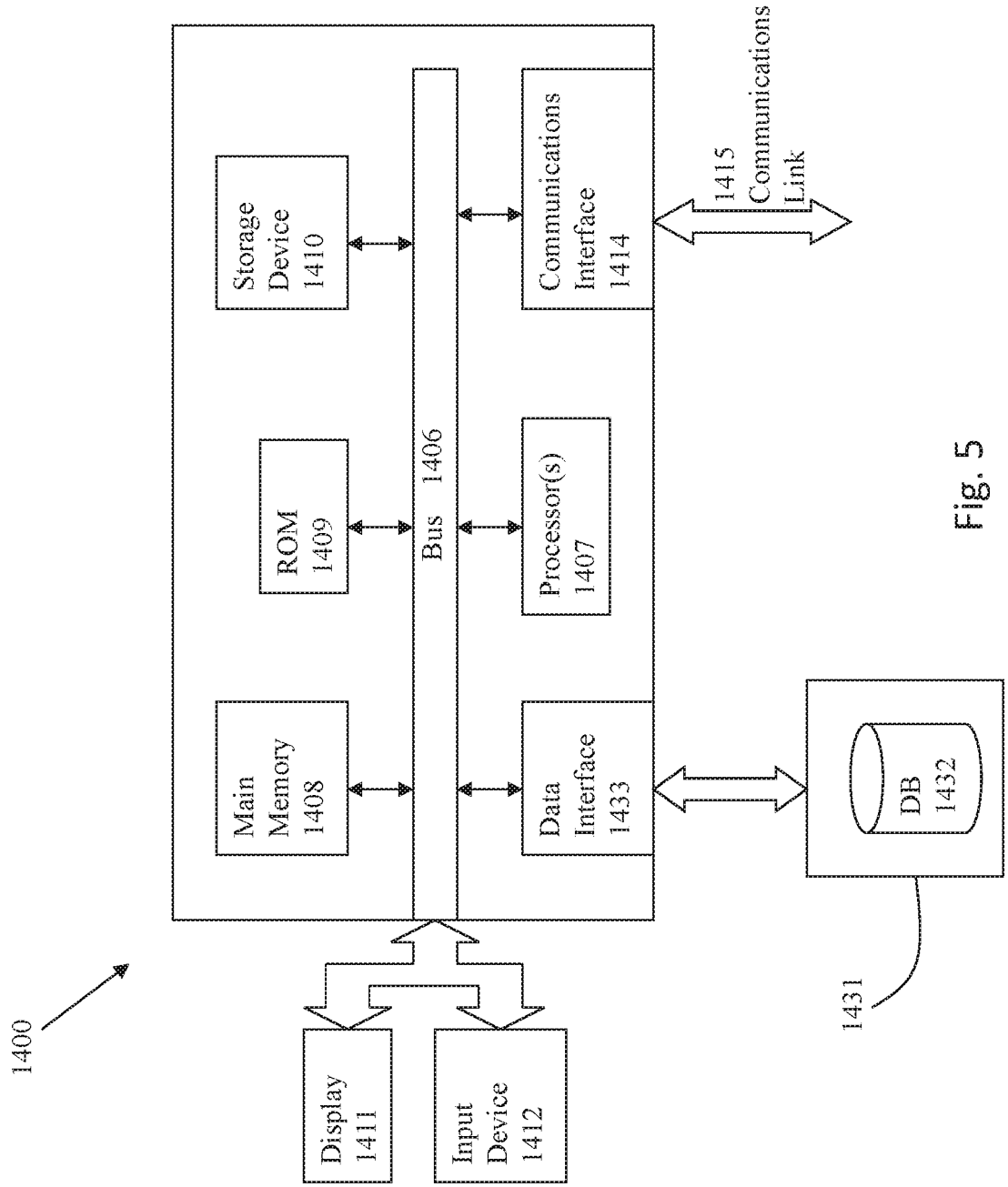
FIG. 5 is a block diagram of an illustrative computing system suitable for implementing an embodiment of the present invention.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 6:
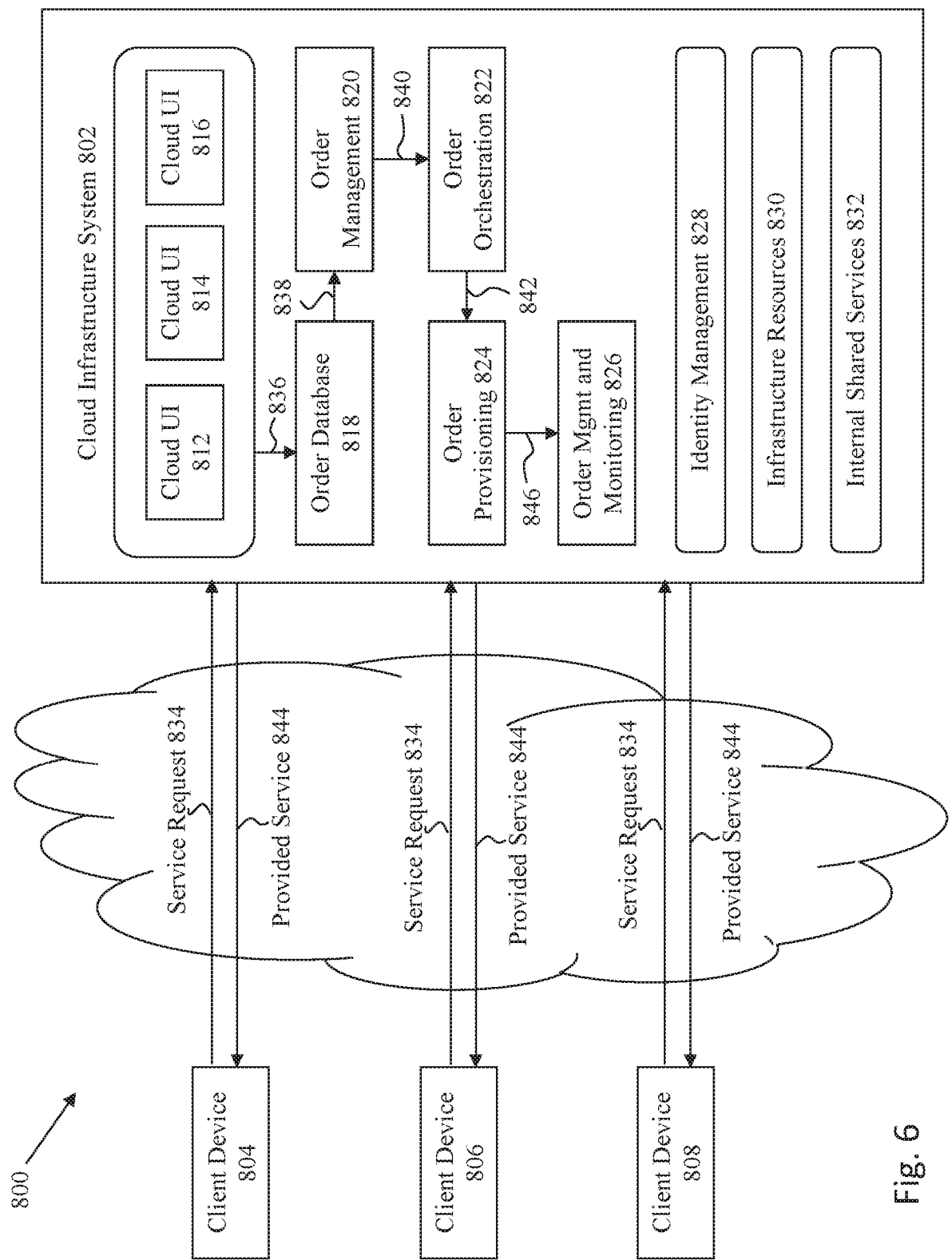
FIG. 6 is a block diagram of one or more components of a system environment in which services may be offered as cloud services, in accordance with an embodiment of the present invention.

FIG. 6 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 5. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method for implementing parallelization of queries in a database system, comprising:
respectively maintaining first and second saved session states for first and second prior network sessions in which one or more parallelization resources were used in processing corresponding prior work requests in a database system, wherein
the first saved session state comprises first configuration data for a first parallelization resource of the one or more parallelization resources that was used in processing a first prior work request of the prior work requests, and
a second saved session state comprises second configuration data for a second parallelization resource of the one or more parallelization resources that was used in processing a second prior work request of the prior work requests;
maintaining a lookup structure that maps each of the prior network sessions to a respective parallelization resource of the one or more parallelization resources;
receiving a parallelization work request to assign work to one or more of the one or more parallelization resources;
accessing the lookup structure to identify a matching parallelization resource from the first and the second parallelization resources to process the parallelization work request based at least in part upon a match between the first or the second saved session state and to the work request;
assigning a matching parallelization resource that corresponds to a matching saved session state to process the parallelization work request; and
configuring the matching parallelization resource for reusing the matching saved session state for the parallelization work request.

2. The method of claim 1, wherein the lookup structure comprises a first mapping of session identifiers (IDs to slave IDs.

3. The method of claim 2, further comprising a second mapping of the slave IDs to database sub-portion IDs.

4. The method of claim 1, further comprising:
determining whether the parallelization work request corresponds to a full match of the first or the second saved session state, a partial match of the first or the second saved session state, or zero match of the first or the second saved session state;
initializing a partial set of the new session state upon identification of the partial match; and
initializing a full set of the new session state upon determination of the zero match.

5. The method of claim 4, further comprising selecting the matching parallelization resource based at least in part upon priority ordering of at least the first and the second saved session states upon identifying multiple ones of the partial match, where matching to a saved connection in a prior network session of the prior network sessions has a higher priority than matching to a saved session state.

6. The method of claim 1, wherein the one or more parallelization resources comprise one or more slave processing entities and one or more database sub-portions.

7. The method of claim 1, further comprising performing garbage collection on the first or the second saved session state at least by:
performing at least one of (a) identifying a selected saved session state based at least in part upon the selected saved session state being a least recently used saved session state, (b) performing prioritized selection of the selected saved session state, or (c) performing adaptive selection of the selected saved session state; and
removing the selected saved session state.

8. The method of claim 7, wherein machine learning is applied to perform the adaptive selection of the selected saved session state.

9. The method of claim 1, wherein the first or the second saved session state for the one or more parallelization resources corresponds to an array of state objects, and a pointer is used to point to a state object from among the array of state objects to configure the matching parallelization resource to use the first or the second saved session state instead of initializing a full new session state for the parallelization work request.

10. The method of claim 9, wherein the pointer points to the state object to configure at least one of a current user, a current role, or a current color.

11. The method of claim 1, wherein
the matching saved session state is characterized by being fully matched or partially matched, and
for the matching saved session state that is partially matched, performing partial setup to configure a state that was not previously saved.

12. A system for implementing parallelization of queries in a database system, comprising:
a processor;
a memory for holding programmable code; and
wherein the programmable code includes at least instructions for:
respectively maintaining first and second saved session states for first and second prior network sessions in which one or more parallelization resources were used in processing corresponding prior work requests in a database system, wherein
the first saved session state comprises first configuration data for a first parallelization resource of the one or more parallelization resources that was used in processing a first prior work request of the prior work requests, and
a second saved session state comprises second configuration data for a second parallelization resource of the one or more parallelization resources that was used in processing a second prior work request of the prior work requests;
maintaining a lookup structure that maps each of the prior network sessions to a respective parallelization resource of the one or more parallelization resources;
receiving a parallelization work request to assign work to one or more of the one or more parallelization resources;
accessing the lookup structure to identify a matching parallelization resource from the first and the second parallelization resources to process the parallelization work request based at least in part upon a match between a matching saved session state of the first or the second and the work request;
assigning a matching parallelization resource that corresponds to the matching saved session state to process the parallelization work request; and
configuring the matching parallelization resource for reusing the matching saved session state for the parallelization work request.

13. The system of claim 12, wherein the lookup structure comprises a mapping of session identifiers (IDs) to slave IDs.

14. The system of claim 13, further comprising a mapping of the slave IDs to database sub-portion IDs.

15. The system of claim 12, wherein the programmable code further includes instructions for determining whether the parallelization work request corresponds to a full match of the first or the second saved session state, a partial match of the first or the second saved session state, or zero match of the first or the second saved session state; initializing a partial set of the new session state upon identification of the partial match; and initializing a full set of the new session state upon determination of the zero match.

16. The system of claim 15, wherein the programmable code includes instructions for selecting the matching parallelization resource based at least in part upon priority ordering of at least the first and the second saved session states upon identifying multiple ones of the partial match, where matching to a saved connection in a prior network session of the prior network sessions has a higher priority than matching to a saved session state.

17. The system of claim 12, wherein the one or more parallelization resources comprise one or more slave processing entities and one or more database sub-portions.

18. The system of claim 12, wherein the programmable code includes instructions for performing garbage collection on the first or the second saved session state at least by:
performing at least one of (a) identifying a selected saved session state based at least in part upon the selected saved session state being a least recently used saved session state, (b) performing prioritized selection of the selected saved session state, or (c) performing adaptive selection of the selected saved session state; and removing the selected saved session state.

19. The system of claim 18, wherein machine learning is applied to perform the adaptive selection of the selected saved session state.

20. The system of claim 12, wherein the first or the second saved session state for the one or more parallelization resources corresponds to an array of state objects, and a pointer is used to point to a state object from among the array of state objects to configure the matching parallelization resource to use the first or the second saved session state instead of initializing a full new session state for the parallelization work request.

21. The system of claim 20, wherein the pointer points to the state object to configure at least one of a current user, a current role, or a current color.

22. The system of claim 12, wherein
the matching saved session state is characterized by being fully matched or partially matched, and
for the matching saved session state that is partially matched, performing partial setup to configure a state that was not previously saved.

23. A computer program product embodied on a computer readable medium, the computer readable medium having stored thereon a sequence of instructions which, when executed by a processor, executes a method for implementing parallelization of queries in a database system comprising:
respectively maintaining first and second saved session states for first and second prior network sessions in which one or more parallelization resources were used in processing corresponding prior work requests in in a database system, wherein
the first saved session state comprises first configuration data for a first parallelization resource of the one or more parallelization resources that was used in processing a first prior work request of the prior work requests, and
a second saved session state comprises second configuration data for a second parallelization resource of the one or more parallelization resources that was used in processing a second prior work request of the prior work requests;
maintaining a lookup structure that maps each of the prior network sessions to a respective parallelization resource of the one or more parallelization resources;
receiving a parallelization work request to assign work to one or more of the one or more parallelization resources;
accessing the lookup structure to identify a matching parallelization resource from the first and the second parallelization resources to process the parallelization work request based at least in part upon a match between a matching saved session state of the first or the second saved session state and the work request;
assigning a matching parallelization resource that corresponds to the matching saved session state to process the parallelization work request; and
configuring the matching parallelization resource for reusing the matching saved session state for the parallelization work request.

24. The computer program product of claim 23, wherein the lookup structure comprises a mapping of session identifiers (IDs) to slave IDs.

25. The computer program product of claim 24, further comprising a mapping of the slave IDs to database sub-portion IDs.

26. The computer program product of claim 23, wherein the sequence of instructions, when executed by a processor, further executes:
determining whether the parallelization work request corresponds to a full match of the first or the second saved session state, a partial match of the first or the second saved session state, or zero match of the first or the second saved session state;
initializing a partial set of the new session state upon identification of the partial match; and
initializing a full set of the new session state upon the zero match.

27. The computer program product of claim 26, wherein the sequence of instructions, when executed by a processor, further executes selecting the matching parallelization resource based at least in part upon priority ordering of at least the first and the second saved session states upon identifying multiple ones of the partial match, where matching to a saved connection in a prior network session of the prior network sessions has a higher priority than matching to a saved session state.

28. The computer program product of claim 23, wherein the one or more parallelization resources comprise one or more slave processing entities and one or more database sub-portions.

29. The computer program product of claim 23, wherein the sequence of instructions, when executed by a processor, further performing garbage collection on the first or the second saved session state at least by:
performing at least one of (a) identifying a selected saved session state based at least in part upon the selected saved session state being a least recently used saved session state, (b) performing prioritized selection of the selected saved session state, or (c) performing adaptive selection of the selected saved session state; and
removing the selected saved session state.

30. The computer program product of claim 29, wherein machine learning is applied to perform the adaptive selection of the selected saved session state.

31. The computer program product of claim 23, wherein the first or the second saved session state for the one or more parallelization resources corresponds to an array of state objects, and a pointer is used to point to a state object from among the array of state objects to configure the matching parallelization resource to use the first or the second saved session state instead of initializing a full new session state for the parallelization work request.

32. The computer program product of claim 31, wherein the pointer points to the state object to configure at least one of a current user, a current role, or a current color.

33. The computer program product of claim 23, wherein the first or the second saved session state corresponds to at least one of an in-memory stored object, an object stored in secondary storage, or a shared object that is shared across multiple parallelization resources.

34. The computer program product of claim 23, wherein the first or the second saved session state corresponds to a partial match, and the first or the second saved session state that is selected corresponds to a higher matching score among the partial match.

35. The computer program product of claim 23, wherein the matching saved session state is characterized by being fully matched or partially matched, and
for the matching saved session state that is partially matched, performing partial setup to configure a state that was not previously saved.

* * * * *

UNITED STATES PATENT AND TRADEMARK OFFICE
CERTIFICATE OF CORRECTION

Page 1 of 1

PATENT NO. : 11,138,215 B2
APPLICATION NO. : 16/024540
DATED : October 5, 2021
INVENTOR(S) : Bastawala et al.

It is certified that error appears in the above-identified patent and that said Letters Patent is hereby corrected as shown below:

On the Title Page

Column 1, under (73) Assignee, Line 2, delete "Redwood Shores (CA)" and insert -- Redwood Shores, CA (US) --, therefor.

Signed and Sealed this
Eighth Day of February, 2022

Drew Hirshfeld
*Performing the Functions and Duties of the
Under Secretary of Commerce for Intellectual Property and
Director of the United States Patent and Trademark Office*